United States Patent [19] [11] 4,347,023
Rizos [45] Aug. 31, 1982

[54] HOLD DOWN SUPPORT SYSTEM

[75] Inventor: Ioannis Rizos, Hohenbrunn, Fed. Rep. of Germany

[73] Assignee: Messerschmitt-Bölkow-Blohm Gesellschaft mit beschränkter Haftung, Munich, Fed. Rep. of Germany

[21] Appl. No.: 100,264

[22] Filed: Dec. 4, 1979

[30] Foreign Application Priority Data

Dec. 8, 1978 [DE] Fed. Rep. of Germany ....... 2853070

[51] Int. Cl.³ ........................... B60P 1/64; B60P 7/06; B63B 25/00
[52] U.S. Cl. ...................................... 410/32; 244/173; 403/328; 410/2; 410/79; 410/81
[58] Field of Search ............ 244/118.1, 137 R, 138 R, 244/173; 280/450; 403/328; 410/2, 43, 71, 72, 73, 74, 75, 76, 90, 91, 106, 107, 111, 116, 137, 156, 32, 79, 80, 77, 78, 81

[56] References Cited
U.S. PATENT DOCUMENTS 2,478,018  8/1949  Sonntag ..................... 244/137 R X
2,489,984  11/1949  Shoemaker .................... 244/137 R
3,733,758  5/1973  Maier et al. .................... 244/173 X
4,155,524  5/1979  Marello et al. ..................... 244/173

FOREIGN PATENT DOCUMENTS 2021580  8/1972  Fed. Rep. of Germany ...... 244/173
2751273  7/1979  Fed. Rep. of Germany ...... 244/173
2038923  7/1980  United Kingdom ............... 244/173

Primary Examiner—Joseph F. Peters, Jr.
Assistant Examiner—Howard Beltran
Attorney, Agent, or Firm—Toren, McGeady & Stanger

[57] ABSTRACT

In a system for holding support elements on a body, which elements can be folded or swung out from the held position, such as support elements used with solar generators on space vehicles, a pin is arranged to carry the support elements and a locking bolt retains the pin in the held position. The locking bolt is biased toward a position where it releases the pin. The pin is tensioned so that it contributes to the biasing action on the locking bolt. A blocking element holds the locking element in position for securing the pin in the held position. When the blocking element is displaced, the locking bolt is released and, due to the biasing action, moves out of the position where it secures the pin in the held position. A number of pin-locking bolt-blocking element combinations can be secured in the held position by a common cable acting on the blocking elements. When the cable is cut, each of the combinations is released at the same time.

15 Claims, 2 Drawing Figures

HOLD DOWN SUPPORT SYSTEM

SUMMARY OF THE INVENTION

The present invention is directed to a system for holding support elements on a body which elements can be folded or swung out from the body, such as where the elements carry solar generators on a space vehicle.

When a space vehicle is launched, the space available in the vehicle or its launching rocket is limited, however, for carrying out its mission, the vehicle must have a source of electrical energy provided by a large area utilization of solar energy along with a semi-conductor arrangement. Accordingly, the space vehicle must be designed to include surface areas which can be exposed to radiation after the launching rocket has been separated from the vehicle. The use of solar generators which can be folded or swung out from the vehicle has afforded a successful solution of the problem. Recent examples of the use of such solar generators have been in the European test satellite OTS, launched in 1978, the Canadian communications satellite CTS, launched in 1976, and Intelsat V which was projected for launching in the middle of 1979.

Unfolding support elements of this type are disclosed in German Offenlegungsschrift No. 27 51 273 and the corresponding U.S. Pat. No. 4,155,524 and German Pat. No. 20 21 580 and the corresponding U.S. Pat. No. 3,733,758. In these patent publications, the support elements are plates, called panels, of a carbon fiber sandwich construction having an area of several square meters and a power/weight ratio of about 30 w/kg or more.

When the rocket is launched, the panels are folded in closely against the body of the space vehicle. During launching and during the period immediately following the separation of the vehicle from the launching rocket, devices must be provided to hold the panels in the folded-in or closed position without having any negative effect on the subsequent displacement or unfolding of the panels into the open position. In the past, hold-down devices have been used for this purpose and engage the edges of the plates, that is, at their outer circumferences. In this regard, note the European satellite Maritime OTS (Marots). In providing the hold-down action, hooks or locking members were arranged on the outer panel and were engaged by a mechanism in the space vehicle or vice versa.

Hold-down devices of this type, that is, hold-down devices acting on the periphery, can only be used in fixing small panels in the folded-in position, since, with increasing size, the freely oscillating surface area increases by its squared power and the forces resulting from launching tend to generate stresses which cannot be controlled or require dimensions having a negative influence on the structure, payload and the like of the space vehicle.

In the use of known hooks or similar hold-down devices, there is the further disadvantage, with an increasing number of panels, that the hold-down device has to be designed of an increasingly wieldy construction and with increasing angle ranges.

Therefore, it is the primary object of the present invention to provide a hold-down system for support or carrier elements to be secured in any order of magnitude and any desired number and in which the releasing movement of the hold-down device is limited to a minimum.

In accordance with the present invention, one or a number of holding pins which extend through the carrier or support elements can be fixed to a space vehicle by means of a locking bolt. Initially, the locking bolt is provided with a biasing action which tends to displace the bolt into position for releasing the holding pin. Releasable blocking elements hold the locking bolt in position for retaining the holding pin in the held or folded-in position.

Additional advantages are provided by various features of the hold-down system.

The advantages of the hold-down system are involved not only in its proven reliability but also in the fact that it is uncomplicated. The system can be adjusted to any size by use of a modular construction. As a result, expensive new developments for other space vehicle configurations are not required. When the system is in use, no energy is required for its actuation, since the necessary energy is stored in the system by providing an initial tension acting on the holding pin so that no additional means need be incorporated into the system. Due to its universal range of applications, the system can be used for other structural elements which must be unfolded or swung out from a body, such as antennas.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
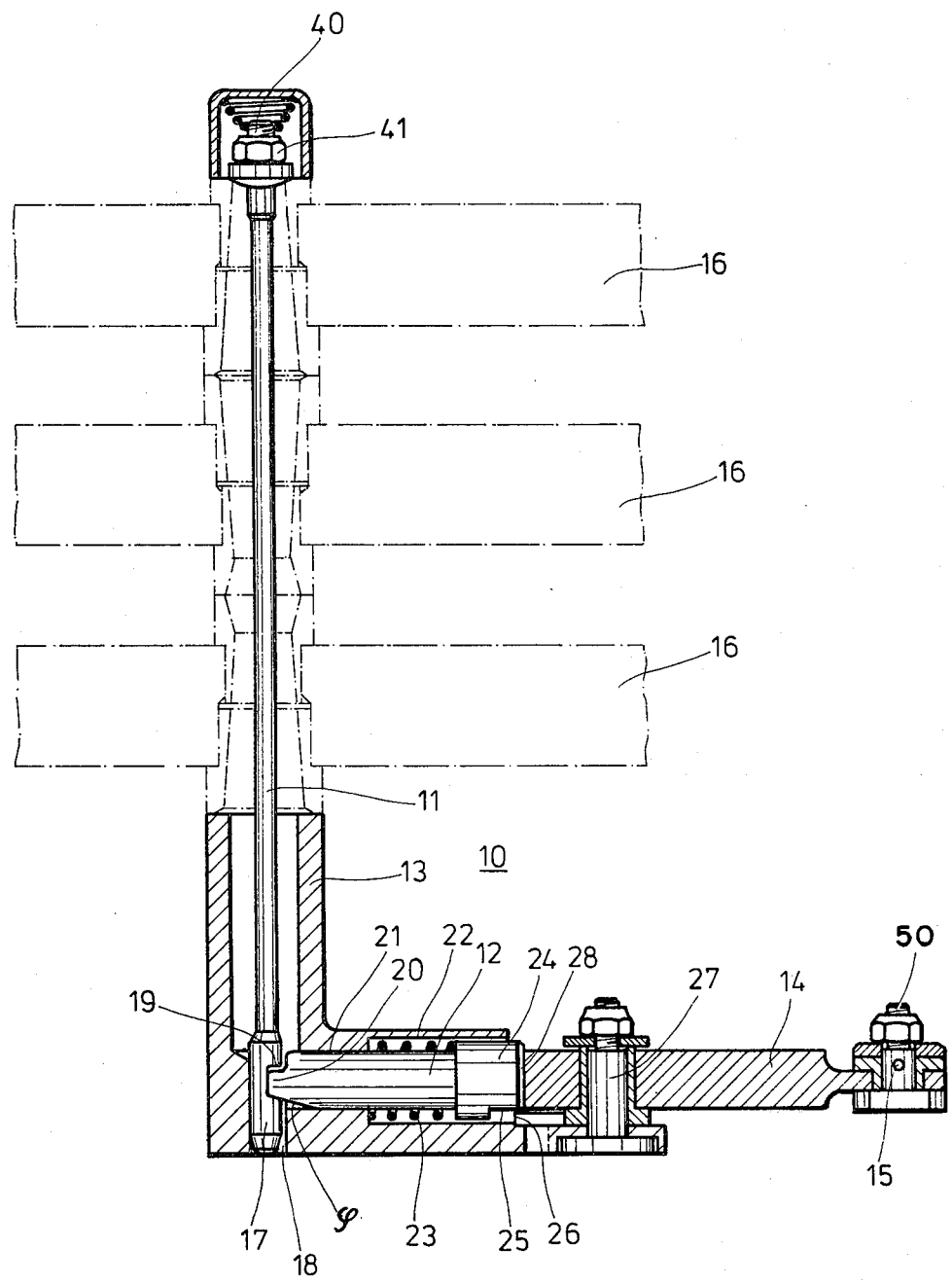
FIG. 1 is a sectional view of a hold-down system embodying the present invention.

In FIG. 1, a hold-down system or device 10 is formed of an axially elongated holding pin 11, a locking bolt 12 extending transversely of the pin, a housing 13 containing the locking bolt and a portion of the holding pin, and blocking element 14.

One end of the axially extending holding pin 11 is located within the housing 13 and it extends outwardly from the housing carrying any desired number of carrier or support elements 16, shown in phantom. At its outer end, the holding pin 11 has a thread 40 so that an initial tension can be applied to the holding pin relative to the carrier elements 16 by means of a nut 41.

As viewed in FIG. 1, the lower end of the holding pin 11 which is located within the housing has an increased diameter portion 17 loosely guided in a bore 18 in the housing 13. One side of the increased diameter portion 17 has a recess 19 with a shape or configuration corresponding to a projection 20 on the end of the locking bolt 12 adjacent the lower end of the holding pin. The projection 20 fits into the recess 19 in surface contact with the recess. The surface of the recess closer to the lower end of the holding pin 11 and extending transversely of the axial direction of the pin is disposed at an oblique angle to the axial direction of the locking bolt which extends approximately perpendicularly to the axial direction of the pin. The surface of the projection 20 is formed at a coinciding oblique angle and the angle is designated in FIG. 1 by φ.

Locking bolt 12 is supported in a bore 21 in the housing 13 with the bore extending perpendicularly of the holding pin 11. As a result, the tension introduced into the holding pin 11 is transmitted to the locking bolt 12 by the arrangement of the obliquely angled surfaces on the recess and the projection so that the locking bolt is biased or has a tendency to recoil in the direction of its axis away from the pin 19. The bore 21 guides the locking bolt 12 in its axial direction within the housing 13. At the opposite end of the bore 21 from the pin 11, a bore 22 of increased diameter contains a spring 23 encircling the locking bolt 12. At one end, the spring is supported against the shoulder provided by the difference in diameter between the bore 21 and the bore 22 while its other end is supported against an enlarged head 24 formed on the end of the locking bolt 12 spaced from the pin 11. The end of the head 24 facing away from the pin 11 has a recess 25 which serves as a stop of any axial displacement of the locking bolt, against an edge 26. In the held down position, that is, when the support elements 16 are held against the space vehicle, the locking bolt 12 is secured with its projection 20 in the recess 19 by means of the blocking element 14. In other words, the biasing action acting on the locking bolt is countered by the blocking element and, as a result, the bolt cannot release the holding pin 11. Blocking element 14 is rotatably supported on a spindle or stub axle 27. The stub axle 27 is inserted into an extension of the housing at the end of the housing opposite the end containing the pin 11. The blocking element is rigidly mechanically connected to a release element on cable 15. Blocking element 14 includes a lever 28, see also FIG. 2, against which pressure is applied by the locking bolt 12. Release element 15, for example, a cable, is fixed in such a way that the blocking element cannot yield to the pressure exerted by the locking bolt 12. To provide this countereffect, the cable or releasing element 15 is placed under tensile stress. When the tensile stress is cancelled, for example, by severing the cable 15, the initial tension stored in the holding pin 11 is suddenly discharged biasing the locking bolt out of contact with the holding pin and causing the blocking element to rotate about the spindle 27 due to the action of the locking bolt on the lever 28. Spring 23 also provides a biasing action tending to displace the locking bolt 12 axially outwardly from the pin 11. When the locking bolt moves from the position where it holds the pin 11, the spring 23 prevents the bolt 12 from rebounding off the stop 26 and being displaced in the direction toward the pin 11. As mentioned, the spring 23 reinforces the axial displacement of the locking bolt 12 out of holding engagement with the pin 11.

In addition to the biasing acting on the locking bolt, as described above, it would also be possible to provide the displacement of the locking bolt by an explosive charge, not illustrated, so that redundancy of actuation would be provided.

To prevent temperature-related problems in the hold-down device 10, the holding pin 11, the locking bolt 12 and the housing 13 can be formed of titanium.

To assure a satisfactory sliding action between them, the recess 19 and the projection 20 are covered with a coating of Molycote.

Figure 2:
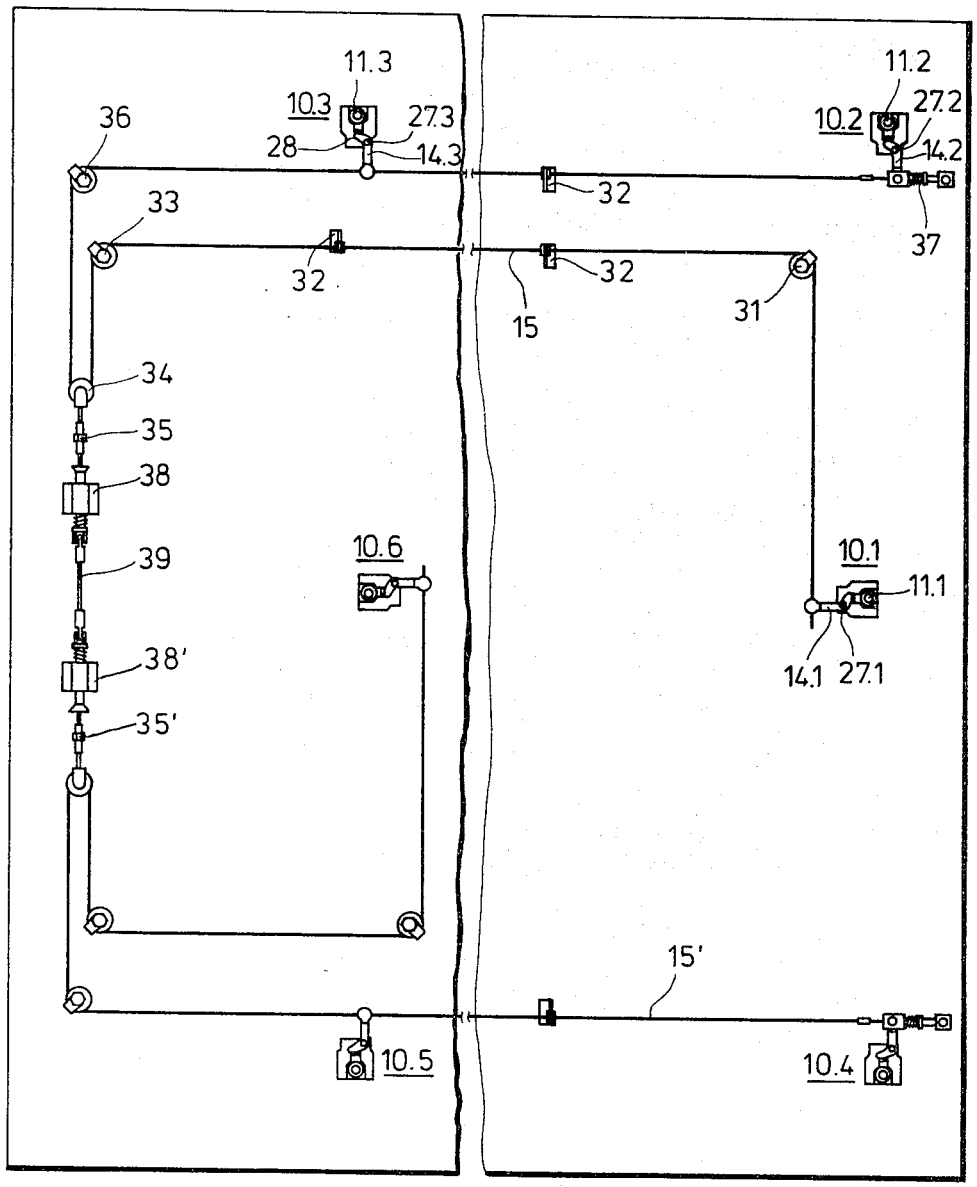
FIG. 2 is a schematic view of a hold-down system incorporating six hold-down devices.

In FIG. 2 a hold-down system is disclosed with six separate hold-down locations being illustrated. This system is utilized to hold-down three panels of a solar generator with each panel being about 1.6×2 m in size. In this arrangement three hold-down locations 10.1, 10.2, 10.3 or 10.4, 10.5, 10.6 are combined in a group and are interconnected by a cable 15 or 15'. Initially, only the upper group 10.1, 10.2, 10.3 will be referred to.

Cable 15 is rigidly mechanically connected to the blocking elements 14.1 and 14.3 by means of a threaded bolt 50, note FIG. 1. The blocking element 14.2 will be referred to below.

Cable 15 extends from the hold-down device 10.1 over a deflection roller 31 and through guide eyes 32 to another deflection roller 33 and then to a free roller 34 which is rigidly connected to a tensioning or stretching device 35. From the free roller 34, the cable 15 passes around another deflection roller 36 to hold-down device 10.3 and then, through another guide eye 32 to hold-down device 10.2. The arrangement of the levers of blocking elements 14.3 and 14.2 is such that their releasing rotations take place about the spindles 27.3 and 27.2 while the rotation of the blocking lever about the spindle 27.1 takes place in the opposite direction. In the region of the blocking element 14.2, the end of cable 15 is connected to a compensating spring 37 which prevents the cable from rupturing at low temperatures such as −100° C. or lower.

The tensioning device 35 is connected to a releasing device 38. Releasing device 38 consists essentially of a set of cup springs, not shown in detail, including a housing, so that the release of tension in the cable is assisted and, simultaneously, compensation is provided for temperature variations.

In the above-described system, three hold-down devices 10.4, 10.5, 10.6 are also provided along with devices 34', 35', and 38' disposed in a mirror image to the upper group of hold-down devices. The releasing devices 38, 38' are connected together via a cable 39.

The tensioned cables 15, 15' and 39 together with the levers of the blocking elements 14.1, 14.2, 14.3 which are analogous to the arrangement in the lower group of devices, represent the blocking elements which prevent the axial displacement of the locking bolts which are biased through the initial tension provided in the holding pins 11.1, 11.2, 11.3 which are also provided in the same manner in the lower group of devices. The cable 15 or 15' extends in such a manner that each of the levers of the blocking elements are secured against displacement. The tension in the cables 15, 15' is adjusted to a required value by means of the tensioning devices 35, 35'. The tendency to block or hold the blocking elements against displacement is maintained by the interaction of the upper group 10.1, 10.2, 10.3 with the lower group 10.4, 10.5, 10.6. When the connecting cable 39 located between the releasing devices 38, 38' is severed, the holding pins of one group are synchronously released and in both groups are released in relation to one another.

While specific embodiments of the invention have been shown and described in detail to illustrate the application of the inventive principles, it will be understood that the invention may be embodied otherwise without departing from such principles.

What is claimed is:

1. System for holding support elements, comprising a hold-down device, said hold-down device including an axially extending pin arranged to support at least one support element, an axially extending locking bolt extending transversely of said pin for securing said pin in the held position, means for biasing said locking bolt out of the position securing said pin in the held position, said biasing means at least in part being introduced into said locking bolt through said pin, blocking means for preventing said locking bolt from being displaced from the position where it secures said pin in the held position, said biasing means comprises a projection extending outwardly from one of said pin and said locking bolt toward the other one of said locking bolt and said pin, a recess formed in the other one of said locking bolt and said pin, said recess having a shape conforming to the shape of said projection and arranged to receive said projection, when said projection is located within said recess each of said projection and recess having a surface in contact with the other said surface with said surfaces extending obliquely of the axial direction of said locking bolt, and means for tensioning said pin so that the interaction of said contacting surfaces biases said locking bolt away from said pin.

2. System, as set forth in claim 1, wherein said recess is formed in said pin and said projection is formed on said locking bolt, said locking bolt extending approximately perpendicularly of said pin, and said obliquely extending surfaces in said recess and on said projection extending transversely of the axial direction of said pin.

3. System, as set forth in claim 2, wherein said blocking means comprises a rotatably mounted blocking element with the axis of rotation of said blocking element being spaced from the adjacent end of said locking bolt, said locking bolt and said blocking element being arranged so that said means for biasing said locking bolt provide tension which is introduced from said locking bolt into said blocking element.

4. System, as set forth in claim 2, wherein the contacting surfaces of said projection and said recess being coated with a material for increasing the sliding movement between said recess and said projection.

5. System, as set forth in claim 4, wherein the contacting surfaces of said recess and said projection are coated with Molycote.

6. System, as set forth in claim 2, wherein a housing laterally encloses said locking bolt, and said means for biasing said locking bolt includes a spring located within said housing and acting on said housing and said locking bolt for biasing said locking bolt from the position where it secures said pin in the held position so that said locking bolt is prevented from rebounding toward said pin.

7. System, as set forth in claim 6, wherein a stop is located on said housing spaced from said pin and arranged in the path of said locking bolt moving out of the position where it secures said pin in the held position for limiting the axial displacement of said locking bolt.

8. System, as set forth in claim 6, wherein said holding pin, said locking bolt and said housing are formed of titanium.

9. System, as set forth in claim 1, including a plurality of said devices, and means for securing each said blocking means in position for preventing said locking bolt in open operative contact therewith from being displaced from the position where it secures said pin in the held position so that upon release of said means said blocking means can be released simultaneously.

10. System, as set forth in claim 9, wherein said means for securing said blocking means comprises a cable connected to each of said hold-down devices so that said cable can be tensioned for retaining said locking bolts in the position where said locking bolts secure said pins in the held position.

11. System, as set forth in claim 10, wherein a temperature compensating device is connected to at least one end of said cable for protecting against temperature variations ranging from low to high temperatures, and said temperature compensating device comprising compensating springs.

12. System, as set forth in claim 10, wherein said cable connects at least two said blocking elements to one another and said blocking elements being arranged to rotate in opposite directions when the tension in said cable is released.

13. System, as set forth in claim 12, wherein said hold-down devices are combined into two equal groups, one said cable for each group, each said cable connected at one of its ends to one of said hold-down devices and at its other end to another one of said hold-down devices, a tensioning device connected to said cable intermediate the ends thereof, a spring-supported releasing device connected to each said tension device, and means for interconnecting said releasing devices.

14. System, as set forth in claim 13, wherein said means for interconnecting said releasing devices comprises a second cable.

15. System, as set forth in claim 14, including a number of deflection rollers, each said cable extending around a number of said deflecting rollers between the ends of said cable, a free roller connected to said tensioning device, and said cable extending around said free roller at a location between two of said deflection rollers.

* * * * *